US012389989B2

(12) United States Patent
Carpano et al.

(10) Patent No.: US 12,389,989 B2
(45) Date of Patent: Aug. 19, 2025

(54) DYNAMIC FLUIDIC JEWELRY

(71) Applicant: Preciflex SA, Neuchâtel (CH)

(72) Inventors: Federica Carpano, La Chaux-de-Fonds (CH); Lucien Vouillamoz, Feusisberg (CH); Johann Rohner, Pomy (CH); Luc Maffli, Neuchâtel (CH); Toralf Bork, Enges (CH); Alain Jaccard, Ste-Croix (CH); Jean Gubelmann, Auvernier (CH); Gregory Dourde, Neuchâtel (CH); Antoine Sandoz, London (GB)

(73) Assignee: PRECIFLEX SA, Neuchâtel (CH)

( * ) Notice: Subject to any disclaimer, the term of this patent is extended or adjusted under 35 U.S.C. 154(b) by 0 days.

(21) Appl. No.: 16/334,358

(22) PCT Filed: Sep. 20, 2017

(86) PCT No.: PCT/IB2017/001146
§ 371 (c)(1),
(2) Date: Mar. 19, 2019

(87) PCT Pub. No.: WO2018/055445
PCT Pub. Date: Mar. 29, 2018

(65) Prior Publication Data

US 2019/0216185 A1 Jul. 18, 2019

Related U.S. Application Data

(60) Provisional application No. 62/445,050, filed on Jan. 11, 2017, provisional application No. 62/404,978, (Continued)

(30) Foreign Application Priority Data

Oct. 6, 2016 (WO) .................. PCT/IB2016/001448

(51) Int. Cl.
*A44C 17/02* (2006.01)
*A44C 1/00* (2006.01)
(Continued)

(52) U.S. Cl.
CPC ................ *A44C 15/00* (2013.01); *A44C 1/00* (2013.01); *A44C 5/0007* (2013.01); *A44C 7/009* (2013.01);
(Continued)

(58) Field of Classification Search
CPC ................................ A44C 17/02; A44C 25/00
See application file for complete search history.

(56) References Cited

U.S. PATENT DOCUMENTS 755,654 A * 3/1904 Guild ..................... A44C 17/02 63/28
1,850,190 A 3/1932 Welch
(Continued)

FOREIGN PATENT DOCUMENTS

CH 701885 A1 3/2011
DE 20120187 U1 * 3/2002 ............... A44C 5/00
(Continued)

OTHER PUBLICATIONS

Google search of "refractive index of onyx" (Year: 2022).*
(Continued)

*Primary Examiner* — Emily M Morgan
(74) *Attorney, Agent, or Firm* — DA VINCI PARTNERS LLC; John Moetteli

(57) ABSTRACT

A construct having an aesthetic form is adapted to please a wearer and to be worn by the wearer. The construct provides a structure having a wearer connection element such as a ring, a chain, a wristband, a pin, a clasp, a clip, and a body piercing element. The functional elements including a fluid reservoir in which at least two fluids are disposed, and a
(Continued)

motion generation system are integrated on the structure, The motion generation system is functionally affixed to the structure so as to agitate the at least two fluids, causing a visual animation effect. The construct, in particular jewelry, may have incorporated therein one or more channels and/or reservoirs containing one or more fluids wherein the fluids as well as the forms and surface treatments of channels/reservoirs are selected possess physical properties so as to promote a defined interaction with the one or more fluids. The interaction influences the visual appearance of the device, such device optionally being made at least in part of precious metals, natural components such as pearls, and/or precious stones.

9 Claims, 18 Drawing Sheets

Related U.S. Application Data filed on Oct. 6, 2016, provisional application No. 62/396,833, filed on Sep. 20, 2016.

(51) Int. Cl.

| | |
|---|---|
| ***A44C 5/00*** | (2006.01) |
| ***A44C 7/00*** | (2006.01) |
| ***A44C 9/00*** | (2006.01) |
| ***A44C 15/00*** | (2006.01) |
| ***A44C 25/00*** | (2006.01) |
| ***G04B 45/00*** | (2006.01) |

(52) U.S. Cl.

CPC ........ *A44C 9/0053* (2013.01); *A44C 15/0005* (2013.01); *A44C 25/002* (2013.01); *G04B 45/0007* (2013.01)

(56) References Cited

U.S. PATENT DOCUMENTS

| | | | | |
|---|---|---|---|---|
| 3,387,396 | A * | 6/1968 | David | G09F 13/24 40/406 |
| 3,486,109 | A | 12/1969 | Schmidt | |
| 4,034,493 | A * | 7/1977 | Ball | B44F 1/066 40/406 |
| 4,034,554 | A | 7/1977 | Hadany | |
| 4,142,383 | A * | 3/1979 | Eberhart | A44C 15/00 156/145 |
| 5,938,318 | A * | 8/1999 | Mattsen | G09F 19/18 362/318 |
| 6,205,816 | B1 * | 3/2001 | Lu | A44C 21/00 63/29.1 |
| 6,907,629 | B2 | 6/2005 | Longton et al. | |
| 8,869,556 | B2 * | 10/2014 | Asscher | A44C 9/0053 63/15 |
| 2003/0043572 | A1 * | 3/2003 | Zale | F21S 10/002 362/101 |
| 2008/0031414 | A1 | 2/2008 | Coppens | |
| 2008/0173045 | A1 * | 7/2008 | Turner | A44C 25/002 63/36 |
| 2010/0017944 | A1 * | 1/2010 | Hirschmann | A44C 17/02 2/244 |
| 2011/0056243 | A1 * | 3/2011 | Asscher | A44C 9/0053 63/32 |
| 2012/0080038 | A1 | 4/2012 | Parrish | |
| 2012/0103015 | A1 * | 5/2012 | Graham | A44C 9/0061 63/15 |
| 2013/0276479 | A1 * | 10/2013 | Noyes | A44C 17/0283 63/28 |
| 2013/0344259 | A1 * | 12/2013 | Birkbeck | C09K 15/34 427/601 |
| 2014/0114173 | A1 | 4/2014 | Bar-Tal et al. | |
| 2014/0316253 | A1 | 10/2014 | Crisco et al. | |
| 2016/0228208 | A1 | 8/2016 | Samsonov et al. | |
| 2016/0242724 | A1 | 8/2016 | Surgivision | |
| 2016/0302747 | A1 | 10/2016 | Averbuch | |
| 2017/0148171 | A1 | 5/2017 | Seto | |
| 2017/0258418 | A1 | 9/2017 | Averbuch et al. | |
| 2018/0295953 | A1 * | 10/2018 | Vouillamoz | A44C 9/00 |

FOREIGN PATENT DOCUMENTS

| | | | | |
|---|---|---|---|---|
| WO | WO2011/021098 A1 | | 2/2011 | |
| WO | WO2014/140779 A2 | | 9/2014 | |
| WO | WO-2017060767 A1 | * | 4/2017 | A44C 1/00 |
| WO | WO-2018055445 A1 | * | 3/2018 | A44C 1/00 |

OTHER PUBLICATIONS

Google search of "refractive index of wood" (Year: 2022).*
International Gem Society, "What is Gemstone Luster?" https://www.gemsociety.org/article/gemstone-luster-polish-luster-fracture-luster/ (Year: 2021).*
ScienceABC.com "Science behind the sparkling brilliance of a diamond", https://www.scienceabc.com/pure-sciences/why-do-diamonds-sparkle.html (Year: 2022).*
International Gem Socieity, "What is Gemstone Transparency". https://www.gemsociety.org/article/gemstone-transparency/ (Year: 2023).*
lesman.com, "Refractive indices of known materials". https://www.lesman.com/refractive-indices-of-known-materials (Year: 2023).*
International Search Report, International patent application No. PCT/IB2016/001448, Jan. 24, 2017.
International Search Report, International patent application No. PCT/IB2017/001146, Sep. 20, 2017.
HYT H1 Hydro Mechanical Watch by Ariel Adams; Jan. 10, 2012.

* cited by examiner

DYNAMIC FLUIDIC JEWELRY

CROSS REFERENCE TO RELATED APPLICATIONS

This application is the National Stage of International Application No. PCT/IB2017/001146, filed Sep. 20, 2017, which claims benefit under 35 USC § 119(a), to U.S. provisional patent application Ser. No. 62/396,833, filed Sep. 20, 2016, to U.S. provisional patent application Ser. No. 62/404,978, filed Oct. 6, 2016, to International Application No. PCT/IB2016/001448, filed Oct. 6, 2016, and to U.S. provisional patent application Ser. No. 62/445,050, filed Jan. 11, 2017.

COPYRIGHT & LEGAL NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. Further, no reference to third party patents or articles made herein is to be construed as an admission that the present invention is not entitled to antedate such material by virtue of prior invention.

BACKGROUND OF THE INVENTION

This invention relates to devices, in particular to jewelry. It is the nature of jewelry to offer an aesthetic design and/or to be equipped with noble elements like crystals, stones, precious metals, and so on. However, typically no visual effects are actively applied to the jewelry. Precious elements are associated therewith in order to further enhance its appearance.

What is needed therefore is a means to enhance the appearance of jewelry by applying visual effects using particular fluids and channels/reservoirs, making use of the fluid's specific physical properties (e.g., immiscibility with other fluids, density, density change in function of the temperature, volume change in function of the temperature, refraction, color, transparency, conductivity, viscosity, ferromagnetic, surface tension, opacity, or state) and/or the channels'/reservoirs' specific physical properties (e.g. surface tension, opacity, transparency, surface structuration, conductivity, ferromagneticity, or state) and/or by influencing/moving the fluid(s) via a mechanical input e.g. through pushing a button or displacing of a jewel element and/or by at least one electrically activated mobile element as aesthetic features.

SUMMARY OF THE INVENTION

A construct of the invention has an aesthetic form is adapted to please a wearer and to be worn by the wearer. The construct provides a structure having a wearer connection element such as a ring, a chain, a wristband, a pin, a clasp, a clip, and a body piercing element. The functional elements including a fluid reservoir in which at least two fluids are disposed, and a motion generation system are integrated on the structure, The motion generation system is functionally affixed to the structure so as to agitate the at least two fluids, causing a visual animation effect.

The construct, in particular jewelry, may have incorporated therein one or more channels and/or reservoirs containing the at least two fluids wherein the fluids as well as the forms and surface treatments of channels/reservoirs are selected possess physical properties so as to promote a defined interaction with the one or more fluids. The interaction influences the visual appearance of the device, such device optionally being made at least in part of precious metals, natural components such as pearls, and/or precious stones.

These fluids, or a portion of the fluids, are visible to an observer and serve as an aesthetic element. Such elements may be colored or without color, may contain floating/non-floating particles or particles in suspension, and so may be animated. The animation in a jewelry piece or a time piece is attained by activating powerable elements relative to their position. The animation elements contain a decorative component that can be precious stones. The fluids may be of gas or liquid, and where there are more than one liquid, these liquids may be immiscible. The device further including any feature or element described in the instant description and/or the drawings herein. A method of operation of the device as described in the instant description and/or the drawings herein.

The thermal expansion of the fluid(s) is managed and compensated according to the invention disclosed in the Patent applications PCT/IB2016/000448, filed on Apr. 7, 2016, PCT/IB2016/000004, filed on Jan. 7, 2016, PCT/IB2015/001611, filed on Sep. 11, 2015, PCT/IB2015/001336, filed on Aug. 6, 2015, PCT/IB2015/000446, filed on Apr. 7, 2015. PCT/IB2015/000448, filed on Apr. 7, 2015, the content of which are incorporated by reference and relied upon to define the invention claimed herein.

The instant document reveals different embodiments of the claimed invention. The embodiments show examples of how to make use of physical properties to establish a defined interaction between channels/reservoirs, fluids and decoration elements.

Those skilled in the art will appreciate that elements in the figures are illustrated for simplicity and clarity and have not necessarily been drawn to scale. For example, dimensions may be exaggerated relative to other elements to help improve understanding of the invention and its embodiments. Furthermore, when the terms 'first', 'second', and the like are used herein, their use is intended for distinguishing between similar elements and not necessarily for describing a sequential or chronological order. Moreover, relative terms like 'front', 'back', 'top' and 'bottom', and the like in the description and/or in the claims are not necessarily used for describing exclusive relative position. Those skilled in the art will therefore understand that such terms may be interchangeable with other terms, and that the embodiments described herein are capable of operating in other orientations than those explicitly illustrated or otherwise described.

DETAILED DESCRIPTION OF THE PREFERRED EMBODIMENT

The following description is not intended to limit the scope of the invention in any way as they are exemplary in nature and serve to describe the best mode of the invention known to the inventors as of the filing date hereof. Consequently, changes may be made in the arrangement and/or function of any of the elements described in the disclosed exemplary embodiments without departing from the spirit and scope of the invention.

Figure 1A:
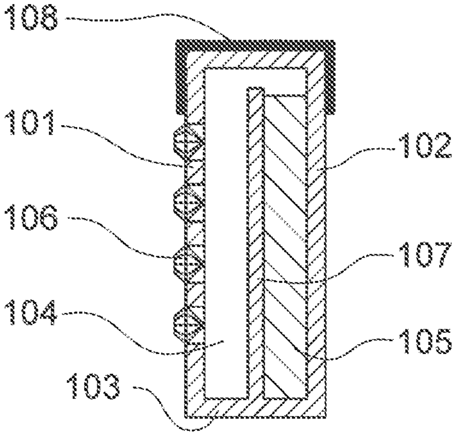
FIG. 1*a* is a cross-sectional view of a first embodiment of the invention.
Figure 1B:
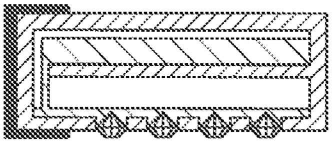
FIG. 1*b* is the cross-sectional view of FIG. 1*a* in another position.
Figure 1C:
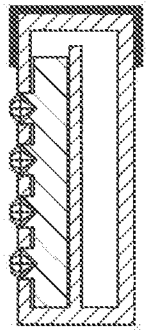
FIG. 1*c* is the cross-sectional view of FIG. 1*a* in still another position.
Figure 1D:
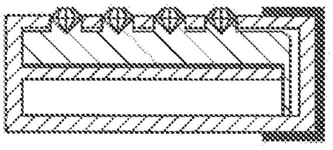
FIG. 1*d* is the cross-sectional view of FIG. 1*a* in still another position.
Figure 1E:
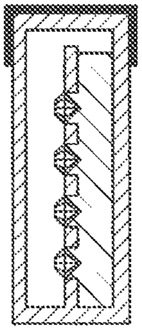
FIG. 1*e* is the cross-sectional view of another variant of the same embodiment.
Figure 1F:
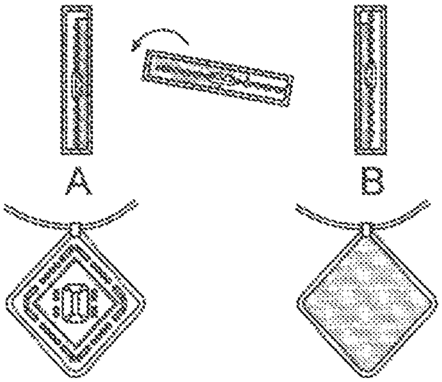
FIG. 1*f* is a schematic view of the first embodiment.

Referring now to FIGS. 1*a* to 1*f*, the device of the invention, typically a piece of jewelry, is made up of a front plate 101, a back plate 102 and a spacer 103. The front plate 101 is preferably made of semi-transparent or partially opaque material, or decorated with transparent parts such as stones, crystals, inclusions, or similar decorative materials 106. The combination of front plate 101, back plate 102 and spacer 103 creates a chamber that can contain one or more fluids 104, 105; fluids 104, 105 may or may not have the same refraction index as the materials of the plates 101, 102 or their decoration 106. The fluids 104, 105 are preferably liquids and/or vapors. The separation 107 (optionally a transparent/semi-transparent/opaque separation or a mirror . . . ) divides the chamber into two reservoirs. The attachment 108 of the device ensures an equilibrium position (relative to gravity) so that each fluid remains in one of the reservoirs. The attachment 108 can also be provided with a hidden thermal compensation system. By temporarily changing the position of the device, from its first position shown in FIG. 1*a*, to a second position shown in FIG. 1*b*, the user can bring the fluids to change their position. FIG. 1*c* shows the device once again in its initial position. The transparent parts of the front plate have changed from one color to another, have become visible or invisible, or are darker/lighter depending on the physical properties of the fluids 104, 105. Changing the position of the device to a third position shown in FIG. 1*d* brings the fluids 104, 105 back to their initial position as shown in FIG. 1*a*. Referring now to FIG. 1*e*, s an alternative embodiment incorporates stones, crystals, inclusions, or similar decorative materials 106, placed on the separation 107 which ensures water tightness of the device. Swapping the fluids 104, 105 changes the visibility of the decorative material 106, e.g. crystals. Referring now to FIG. 1*f*, the device is implemented in an earring.

Figure 2A:
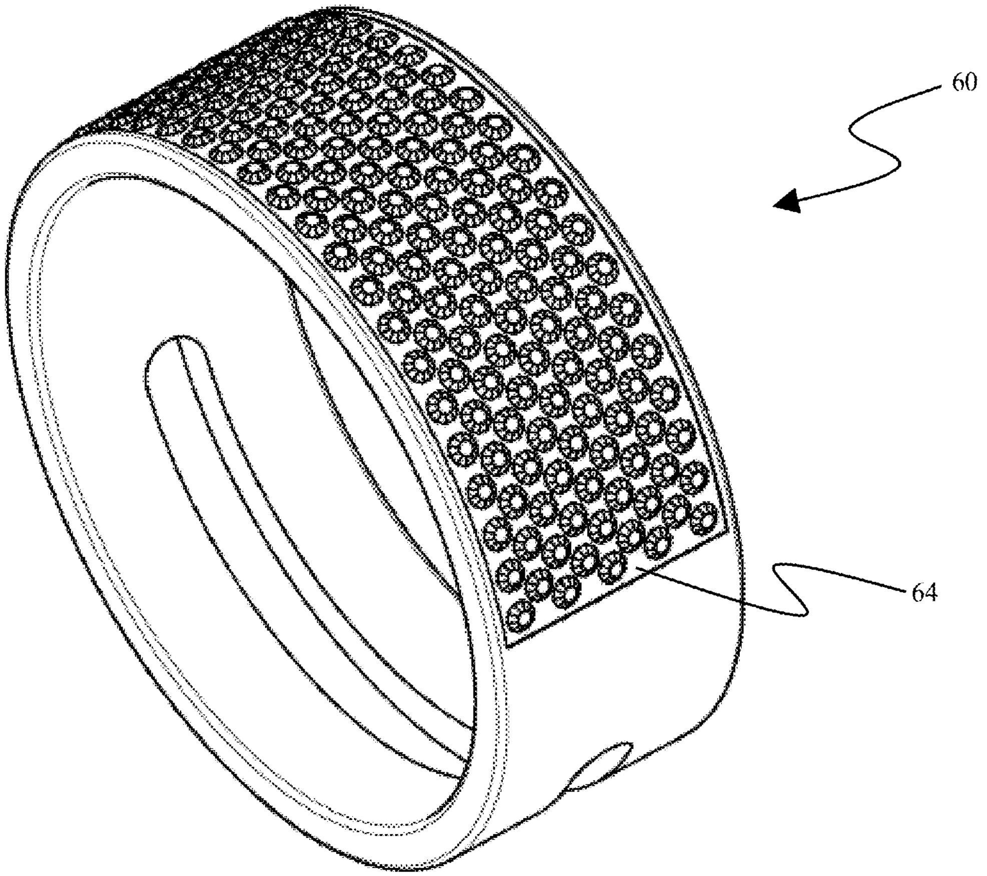
FIG. 2*a* is a perspective view of a second embodiment.
Figure 2B:
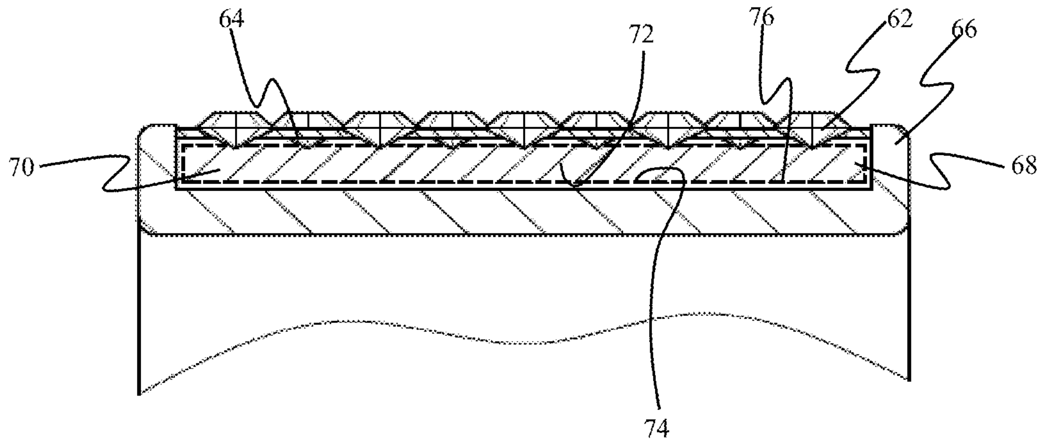
FIG. 2*b* is a cross-sectional view of the second embodiment.

Referring now to FIGS. 2A and 2B, a bracelet 60 with a setting of precious or semi-precious stones 62 is shown, set in a glass or crystal plate 64, itself bonded to a base 66. One or more fluids 68, 70, one of which may be a gas, are contained between this base 66 and this plate 64, with one of the liquids optionally being a ferrofluid. hydrophobic, hydrophilic or oleophobic or oleophilic coatings 72, 74 that repel and/or attract the liquids and so cause pockets of said liquid 68 or 70 to wet a certain number of stones 62, inside a chamber 76 on the metal base 66 and/or on the glass or crystal 64. The stones 62 are preferably coated or non-coated. The refraction index of the liquids 68, 70 is chosen so as to dull the luster of the stones 62 which forms a contrast with the stones whose base is in the gas. This creates moving designs in the setting as shown. The stones 62 are impermeably mounted in a watertight manner to the glass or crystal 64.

Figure 2C:
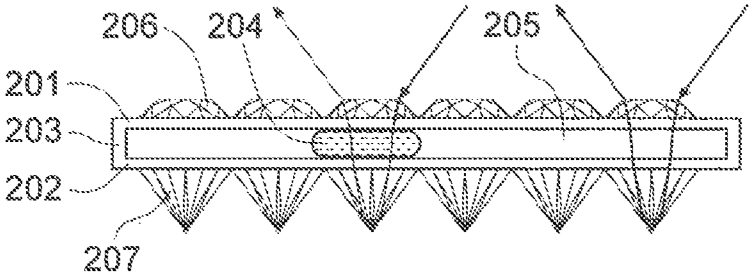
FIG. 2*c* is a cross-sectional view of the second embodiment of the invention in one phase of operation.
Figure 2D:
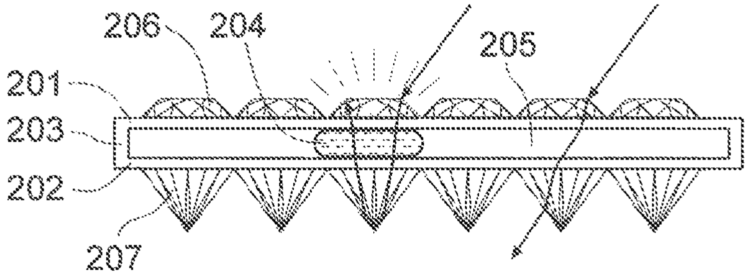
FIG. 2*d* is a cross-sectional view of the second embodiment of the invention in a second phase of operation.
Figure 2E:
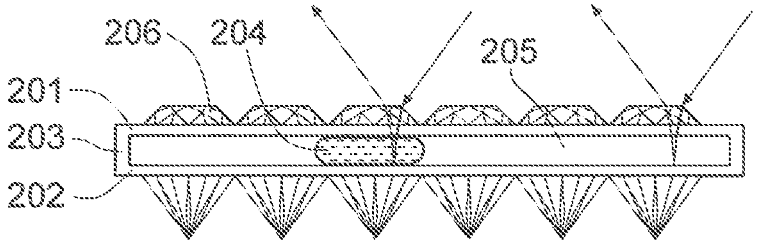
FIG. 2*e* is a cross-sectional view of the second embodiment of the invention in a third phase of operation.
Figure 2F:
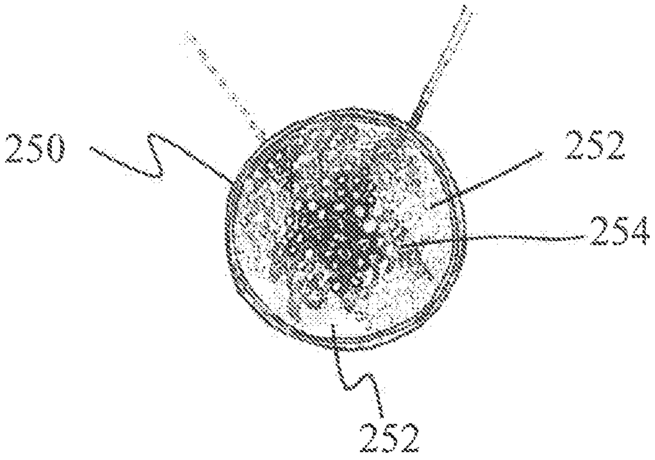
FIG. 2*f* is a cross-sectional view of the second embodiment of the invention in a forth phase of operation.
Figure 2G:
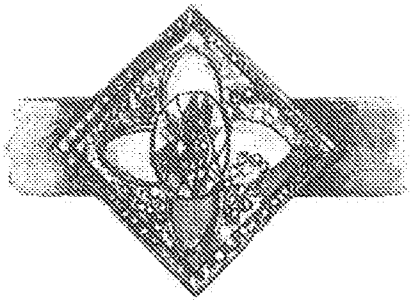
FIG. 2*g* is a cross-sectional view of the second embodiment of the invention in a fifth phase of operation.

Referring now to FIGS. 2*c* to 2*g*, a variant of the embodiment shown in FIGS. 2*a* and 2*b* in which the shape of the plates' decoration 206 and 207 are designed in such a way as to recreate the appearance of diamonds or other shapes. In particular, FIG. 2*c* shows the embodiment equipped with a transparent/semi-transparent back plate 202. The color of some of the decorative elements 206 (a crystal in FIG. 2*c*) change depending of the position of the fluid 204. In FIG. 2*c*, fluid 204 is colored and fluid 205 is transparent. FIG. 2*d* shows the embodiment equipped with a transparent/semi-transparent back plate 202. The visibility of some of the decorative elements 206 (as well in FIG. 2*d* in which the decorative element is a crystal) change depending of the position of the fluid 204. In FIG. 2*d*, fluid 204 has a refraction index selected in order to refract the light to change the visibility of the decorative element 206 located near the fluid 204. FIG. 2*e* shows the embodiment equipped with a back plate 202 made up of a metalized surface (providing a mirror effect). The color of some of the decorative elements 206 (as well in FIG. 2*e* a crystal) change depending of the position of the fluid 204. The fluid 204 is preferably colored or transparent and have refraction indexes selected in order to refract the light to change the visibility of the decorative element 206 located near the fluid 204. FIG. 2*f* shows the device implemented in a pendent 250. By way of example, the pendent 250 is preferably made of glass 252 and/or precious stones 254, for example, crystals. The pendent 250 contains a fluid or liquid 256. In particular, FIG. 2*g* shows the device implemented in another bracelet.

Figure 3A:
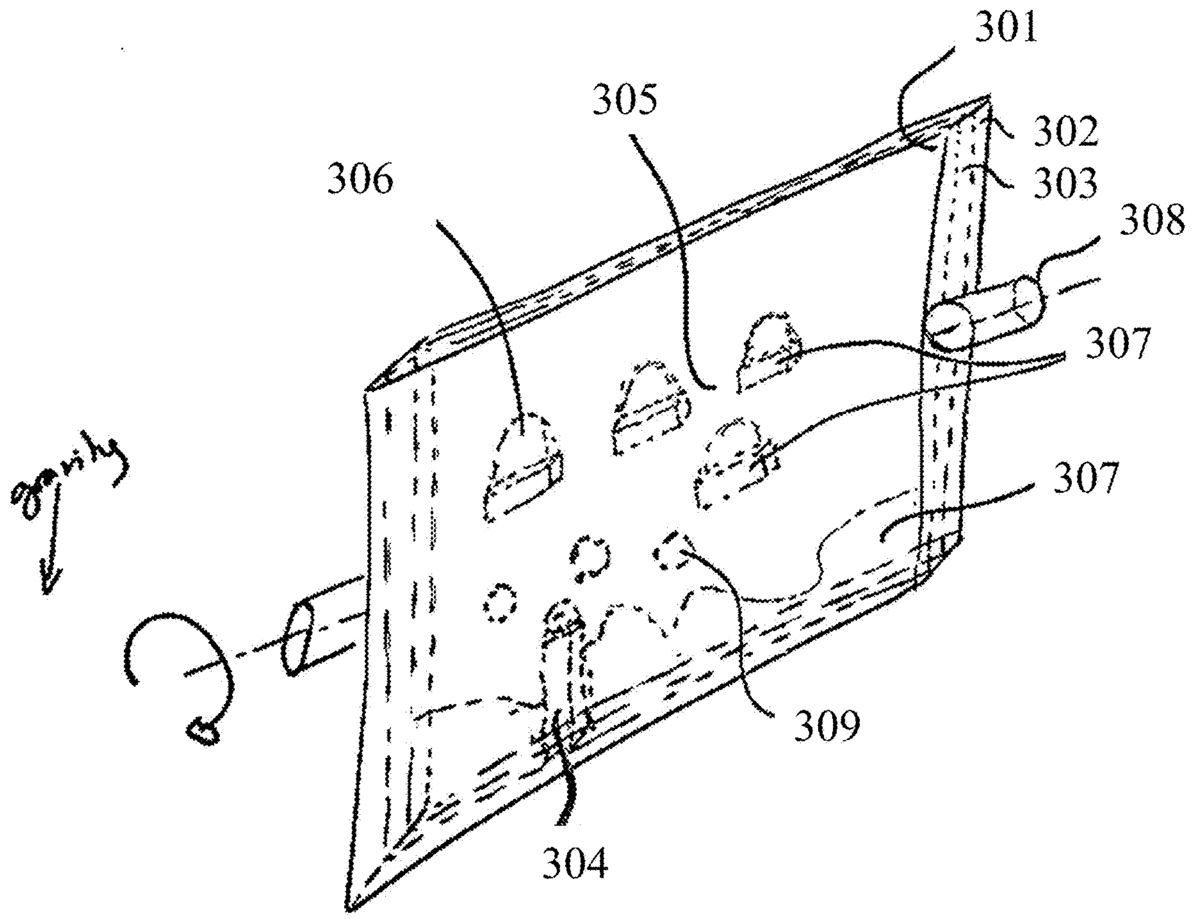
FIG. 3*a* is a schematic view of a third embodiment.
Figure 3B:
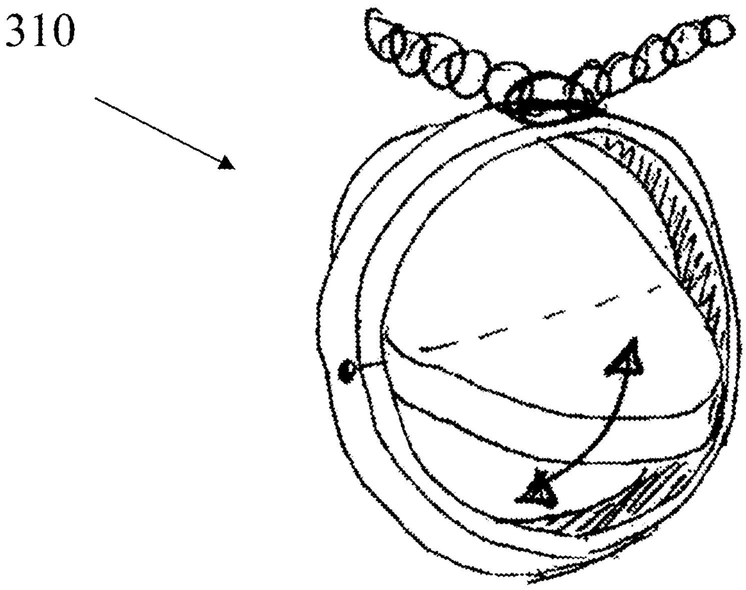
FIG. 3*b* is a view of the third embodiment set as a necklace.
Figure 3C:
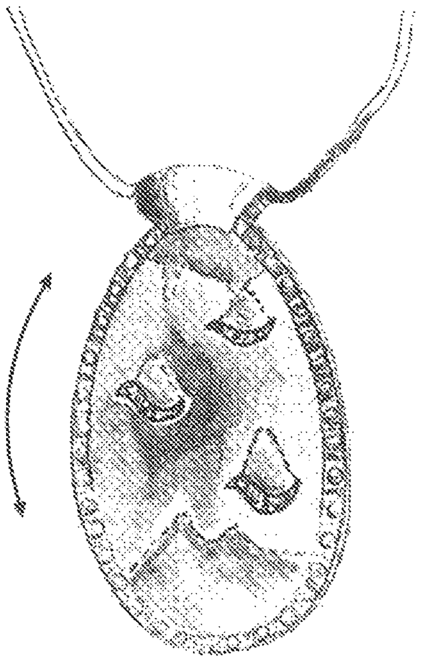
FIG. 3*c* is a second view of the third embodiment set as a necklace.
Figure 3D:
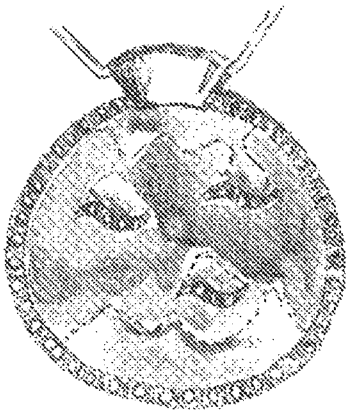
FIG. 3*d* is a third view of the third embodiment set as a necklace.
Figure 3E:
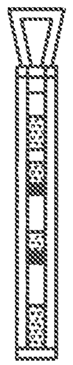
FIG. 3*e* is a side view of the third embodiment.

Referring now to FIGS. 3*a* to 3*e*, the device of the invention is made up of front plate 301 and a back plate 302. The front plate 301 is preferably made of transparent, semi-transparent or partially opaque material, or is preferably decorated with stones, crystals, inclusions, or similar decorative materials. The back plate 302 is preferably made of transparent, semi-transparent, partially opaque, opaque or metallized materials (providing a mirror effect), or decorated with stones, crystals, inclusions, or similar decorative materials. The combination of front plate 301, back plate 302 and spacer 303 creates a chamber 307 that contains one or more immiscible fluids of different density. The fluids may contain one or more particles or mobile elements 309. The fluids may or may not have the same refraction index as particles or mobile elements 309. The chamber 307 may contain shelves 304, the shelves 304 generating an accumulation 306 of fluids and/or particles or mobile elements 309. The shelves 304 may generate a flow limitation 305 for fluids or particles or mobile elements 309 in order to accumulate at the bottom of chamber 307. The shelves 304 are preferably visible or hidden. A rotation axis 308 allowing to orientate the system upside down, initiating movement of the fluid with the higher density to flow downwards and hence creating a new partially random picture. The flow speed of particles or mobile elements 309 is also influenced by fluids' properties (viscosity, presence of bubbles, . . . ) The chamber 307 is preferably shaped as a rectangle as shown in FIG. 3*a*, but of course may be round as shown in FIG. 3*b*, or in another form such as oval or square (not shown in the Figures). Referring to FIGS. 3*b* to 3*e*, round chamber 310 and alternate attachment mechanisms allowing the rotation of the chamber.

Figure 4A:
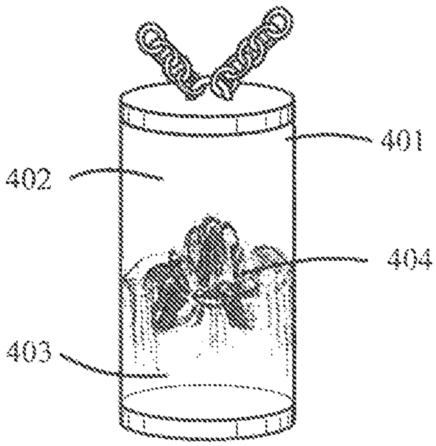
FIG. 4*a* is a perspective view of a forth embodiment of the invention.
Figure 4B:
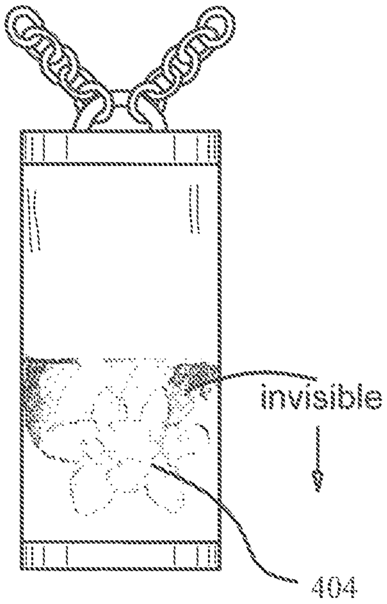
FIG. 4*b* is a front view of the forth embodiment in one phase.
Figure 4C:
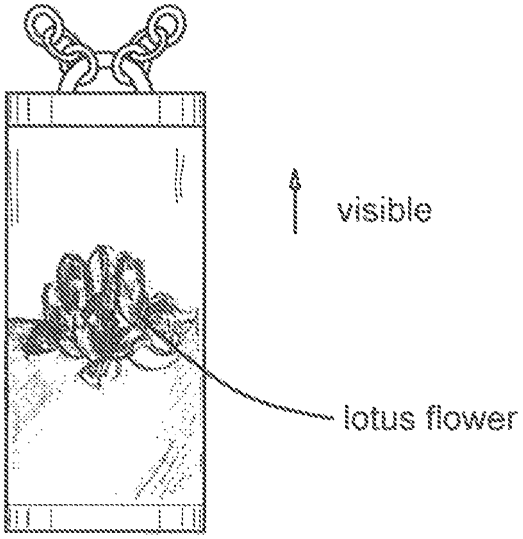
FIG. 4*c* is a front view of the forth embodiment in another phase.
Figure 4D:
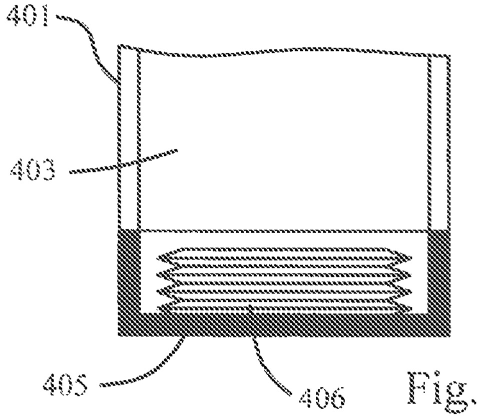
FIG. 4*d* is a front cross-sectional view of the forth embodiment showing a bellows reservoir.

Referring now to FIGS. 4*a* to 4*d* show a container 401 of the invention being made of a transparent, semi-transparent, or partially opaque material, or a material decorated with stones, crystals, inclusions, or similar decorative elements. The container 401 may contain a visible or a hidden temperature compensation system. The container 401 further encloses a top fluid 402 and a bottom fluid 403. The top fluid 402 is preferably transparent, semi-transparent or colored, may consist of more than one fluid (including gas bubbles to aid in thermal expansion management), or may be gas. The top fluid 402 has a lower density than the bottom fluid 403. The top fluid 402 and the bottom fluid 403 are non-miscible. The bottom fluid 403 may be transparent, semi-transparent or colored. The bottom fluid 403 has a higher density than the top fluid 402. The bottom fluid 403 may have the same refraction index as the aesthetic element 404. The bottom fluid 403 is selected to have a large variation in density with temperature. The aesthetic element 404 is contained in the container 401 and is essentially surrounded by at least one fluid. The aesthetic element 404 is made of transparent or colored material and may itself contain another fluid or liquid advantageously having a substantially different form or shape than the element 404 itself. In this embodiment, although the element 404 becomes invisible when surrounded with a liquid having substantially the same refraction index, what is contained in the element 404 is of another shape, giving the impression that the element 404 completely changes form or transforms into another shape as the liquid covers or recedes from it. The aesthetic element 404 is preferably held in the system by a transparent fixture such as e.g. a thread. The density of the aesthetic element 404 may be adjusted via, for example, connection with bellows 406, which controls the amount of fluid pumped into the element 404 to cause the element to float or sink. In another variant, the density of the aesthetic element 404 is adjusted in order to cause the element to float below the surface of the bottom fluid 403 when the temperature of the device (container 401, top fluid 402, bottom fluid 403, aesthetic element 404) is below a given temperature and to float partially on the surface of the bottom fluid 403 when the temperature of said device is above that temperature. When the temperature is low, the aesthetic element 404 floats below the surface of the bottom fluid 403, and if the refraction index of bottom fluid 403 is the same as the aesthetic element 404, it becomes invisible. Alternatively, in order to obtain the same effect, the bottom fluid 403 is preferably opaque, or the container 401 may be opaque in its lower part. When the temperature is higher, the aesthetic element 404 moves up and becomes partially/fully visible. Referring to FIG. 4*d*, a variant of container 401 is shown, comprising a flexible bellows 406 filled with a fluid with high thermal expansion properties. Expansion or contraction of the bellow 406 changes the level of the bottom fluid 403, hiding or displaying the aesthetic element 404. As a further alternative, the aesthetic element 404 is preferably fixed on the bellow and moves up/down, hiding or showing in function of the thermal expansion/contraction of the fluid contained within the bellow 406.

Figure 5A:
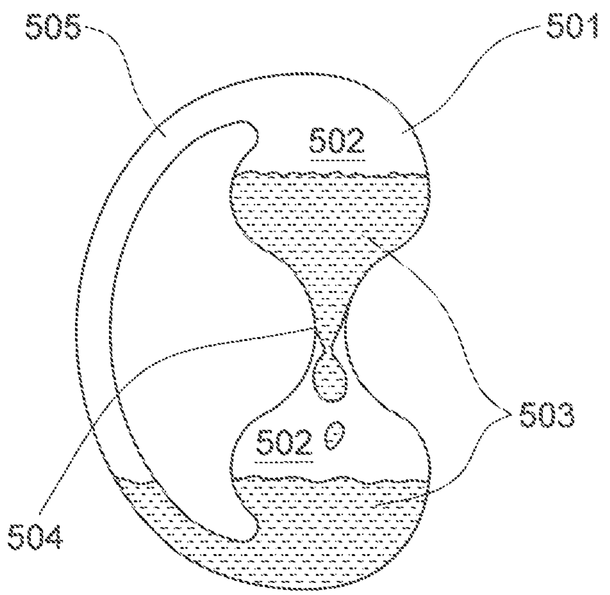
FIG. 5*a* is a schematic diagram of a fifth embodiment.
Figure 5B:
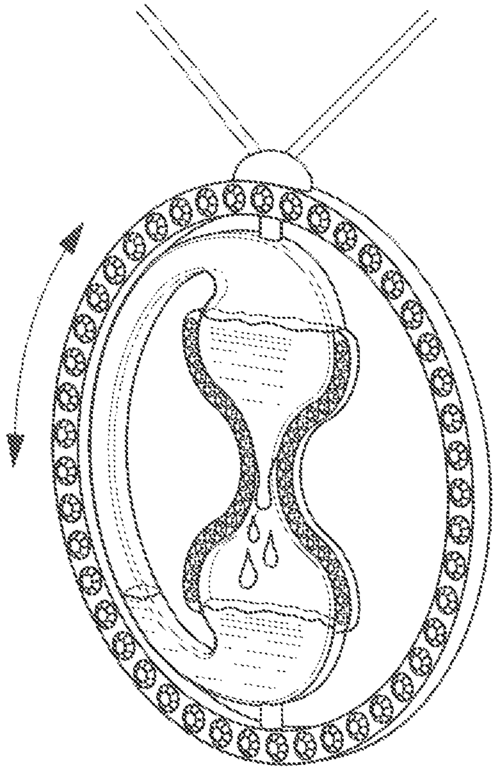
FIG. 5*b* is a perspective view of the fifth embodiment implemented in a necklace pendant.
Figure 5C:
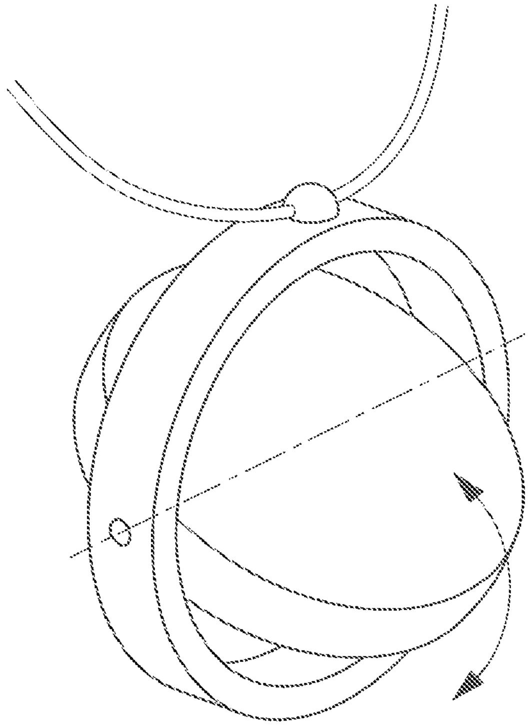
FIG. 5*c* is a schematic perspective view of the fifth embodiment pendant implementation.

Referring now to FIGS. 5*a* to 5*c*, a container 501 of the invention includes transparent, semi-transparent or partially opaque material, or is decorated with stones, crystals, inclusions, or similar decorative elements. The container 501 may contain a visible or a hidden temperature compensation system. The container further contains a light weight fluid 502 and a heavy weight fluid 503. The light weight fluid 502 may be transparent, semi-transparent or colored. The light weight fluid may consist of more than one fluid (including gas bubbles for thermal expansion management), or may be gas. The light fluid 502 has a lower density than the heavy weight fluid 503. The light weight fluid 502 and the heavy weight fluid 503 are non-miscible. The heavy weight fluid 503 may be transparent, semi-transparent or colored. The heavy weight fluid 503 has a higher density than the lighter weight fluid 502. The container 501 comprises a tight opening 504 (optionally calibrated), allowing the heavy weight fluid 503 to drip down into the lower part of the container 501 and the light weight fluid 502 to drip or flow up into the higher part of the container 501. Channel 505 (optional) enables bringing bring back the heavy weight fluid 503 into the top part of the container 501 when the system is turned upside down. An attachment system 506 holds the system in an upright position. FIG. 5*c* illustrates an alternative attachment system 506, allowing the system to be turned upside down, which has as the advantage that no channel 505 is necessary.

Figure 6A:
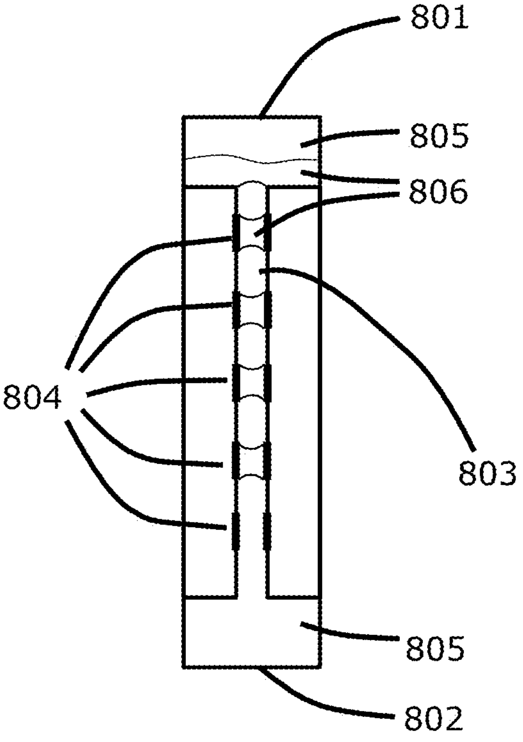
FIG. 6*a* is a cross-section view of a sixth embodiment.
Figure 6B:
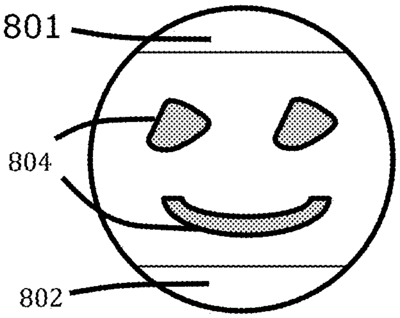
FIG. 6*b* is a front view of the sixth embodiment.
Figure 6C:
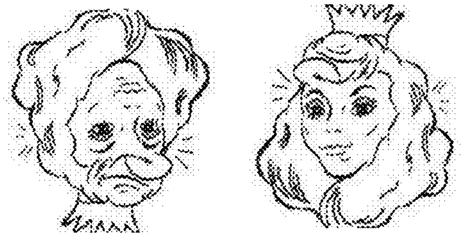
FIG. 6*c* shows the sixth embodiment displaying a picture when filling in upright/upside down position.
Figure 6D:
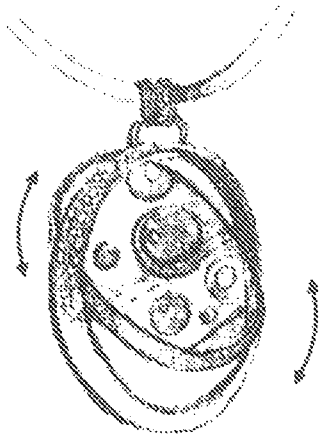
FIG. 6*d* is a perspective view of one implementation of the sixth embodiment as a pendent.
Figure 6E:
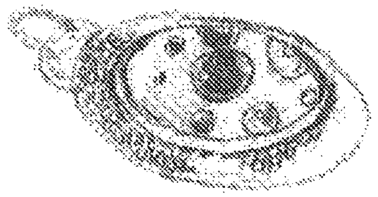
FIG. 6*e* is another view of the sixth embodiment.
Figure 6F:
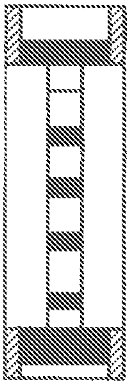
FIG. 6*f* is a schematic side view of the sixth embodiment.
Figure 6G:
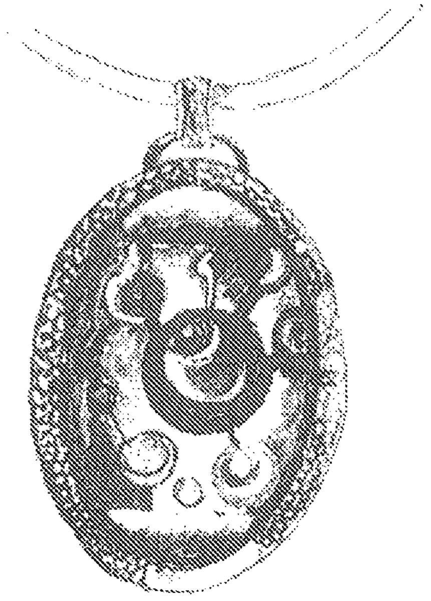
FIG. 6*g* is a front view of the sixth embodiment.
Figure 7A:
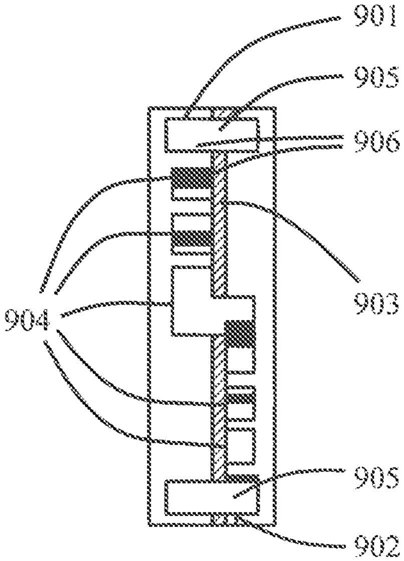
FIG. 7*a* is a schematic cross-sectional view of a seventh embodiment.
Figure 7B:
FIG. 7*b* shows an implementation of the seventh embodiment.
Figure 7C:
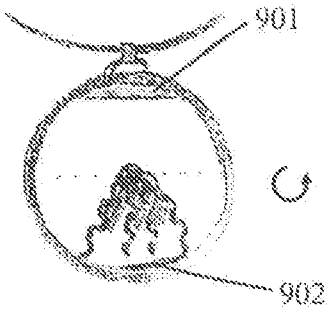
FIG. 7*c* shows a front view of the implementation of the seventh embodiment.
Figure 7D:
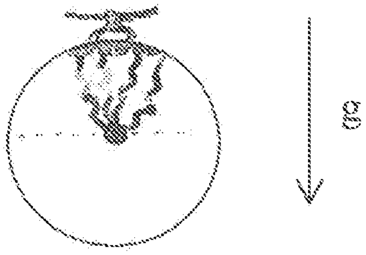
FIG. 7*d* shows a rear view of the implementation of the seventh embodiment, which is not visible to a viewer.

Referring now to FIGS. 6*a* to 6*g*, the device, again, typically a piece of jewelry, consisting of a top reservoir 801 and a bottom reservoir 802. The top reservoir 801 consisting of transparent, semi-transparent, partially opaque or opaque material. The top reservoir 801 may contain a visible or an invisible temperature compensation system. The bottom reservoir 802 is made up of a transparent, semi-transparent, colored, partially opaque or opaque material. The bottom reservoir 802 may contain a visible or a hidden temperature compensation system. This device further includes a picture chamber 803. The picture chamber 803 may be of transparent, semi-transparent or colored material. The picture chamber 803 is connected to the top reservoir 801 and the bottom reservoir 802. The picture chamber has further zones with surface treatment and/or micro-structuration creating patterns 804. The container provided through the connected top reservoir 801, the picture chamber 803 and the bottom reservoir 802 contains a light weight fluid 805 and a heavy weight fluid 806. The light weight fluid 805 may be transparent, semi-transparent or colored. The light weight fluid 805 may be made up of more than one non-miscible fluid (include gas bubbles for thermal expansion management), or may be gas. The light weight fluid 805 has a lower density than the heavy weight fluid 806. The light weight fluid 805 and the heavy weight fluid are non-miscible. The heavy weight fluid 806 may be transparent, semi-transparent or colored. The heavy weight fluid 806 has a higher density than the light weight fluid 805. An attachment system 807 holds the system in upright position and allows the device to be held in upright or upside down position. In the position of the device illustrated in FIG. 6*a*, the heavy weight fluid 806 moves down due to gravity from top reservoir 801 to the bottom reservoir 802, but is slowed down in zones with specific coating or micro structuration 804, progressively filling the picture chamber 803, then emptying it, until the heavy weight fluid is completely contained in the bottom reservoir 802. During that time, the light weight fluid 805 moves up from the bottom reservoir 802 to the top reservoir 801. A selected combination of the viscosity of the fluids 805, 806 and the size of the channels given by the picture chamber 803 may be carefully made in order to set the time for fade in/fade out of the image illustrated through the heavy weight fluid 806 which is slowed down. Then the device is adapted to be turned upside down, and at this time, the filling or emptying of the image restarts. The coating and/or micro structuration patterns 804 are preferably made in such a way as to display a different picture when filling in upright or upside down position (FIG. 6*c*). By way of example, FIGS. 6*d* to 6*g* illustrate the present embodiment implemented in jewelry.

Referring now to FIGS. 7*a* to 7*d*, the device includes a top reservoir 901 and a bottom reservoir 902. The top reservoir 901 is made up of transparent, semi-transparent, partially opaque or opaque material. The top reservoir 901 may contain a visible or a hidden temperature compensation system. The bottom reservoir 902 is made up of transparent, semi-transparent, colored, partially opaque or opaque material. The bottom reservoir 902 may contain a visible or a hidden temperature compensation system. The device further optionally includes a picture background 903 of transparent, semi-transparent, colored, partially opaque or opaque material. A network of channels 904, with or without surface treatment and/or micro-structuration, is connected to the top reservoir 901 and the bottom reservoir 902. The network channels 904 can either be in front or behind the picture background 903. The device contains a light weight fluid 905 and a heavy weight fluid 906. The light weight fluid 905 may be transparent, semi-transparent or colored. The light weight fluid 905 may be made up of more than one fluid (include gas bubbles for thermal expansion management), or may be gas. The light weight fluid 905 has a lower density than the heavy weight fluid 906. The light weight fluid 905 and the heavy weight fluid are non-miscible. The heavy weight fluid 906 may be transparent, semi-transparent or colored. The heavy weight 906 fluid has a higher density than the light weight fluid 905. An attachment system 907 holds the system in upright position and allows the device to be held in upright or upside down position. The heavy weight fluid 906 moves down due to the effect of gravity from top reservoir 901 to bottom reservoir 902, but is slowed down and distributed in the network channels 904, progressively filling the picture, then emptying it, until it is completely contained in the bottom reservoir 902. During that time, the light fluid 905 moves up from the bottom reservoir 902 to the top reservoir 901. Combination of the viscosity of the fluids 905, 906 and size of the channels 904 is very carefully made in order to set the time during which the picture is to be visible or "alive". Then the device is turned upside down, and the filling/emptying of the image restarts.

Figure 8A:
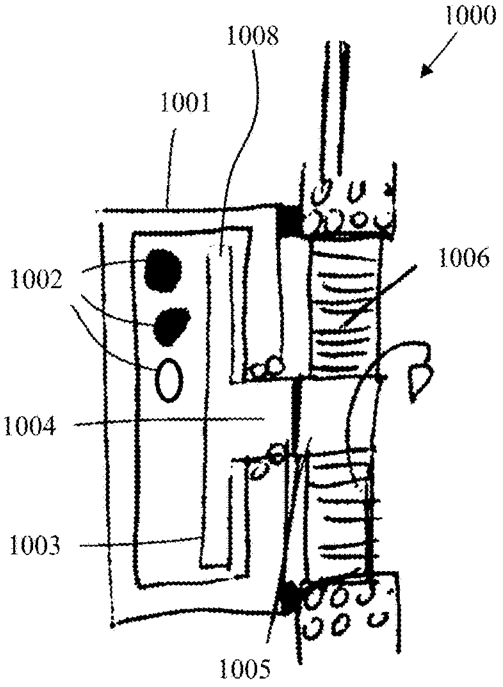
FIG. 8*a* is a schematic cross-sectioned view of an eighth embodiment.
Figure 8B:
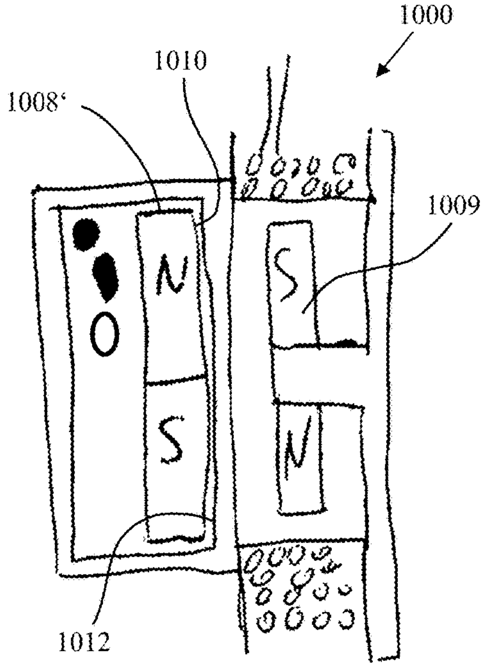
FIG. 8*b* is still another schematic of the eighth embodiment.
Figure 8C:
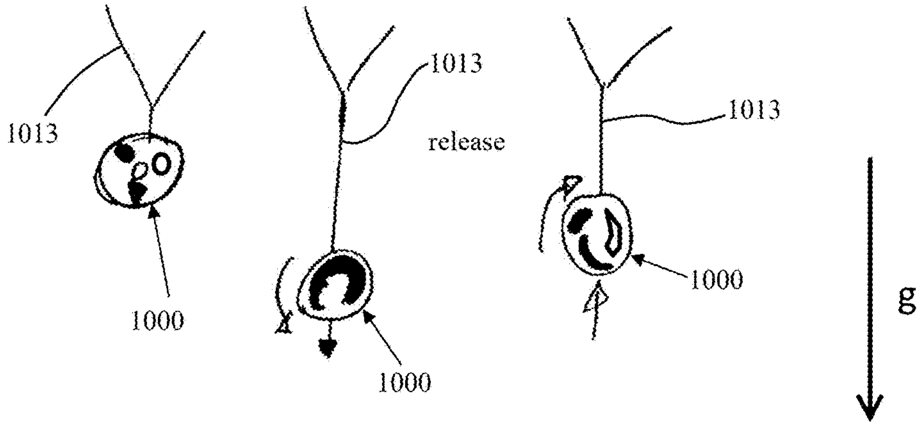
FIG. 8*c* shows a different implementation of the eight embodiment.
Figure 9A:
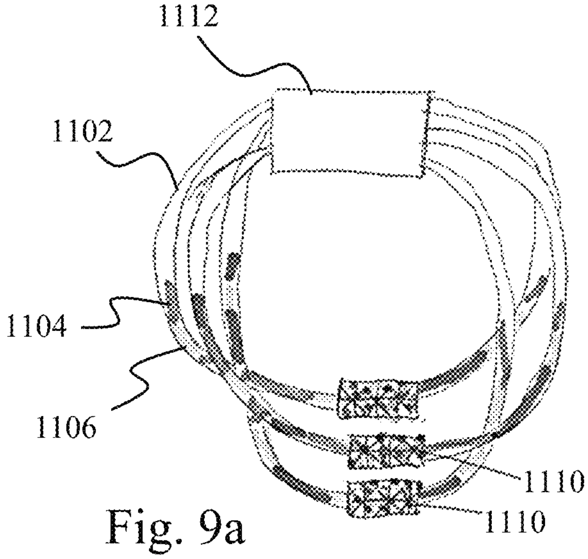
FIG. 9*a* is a schematic view of a ninth embodiment.
Figure 9B:
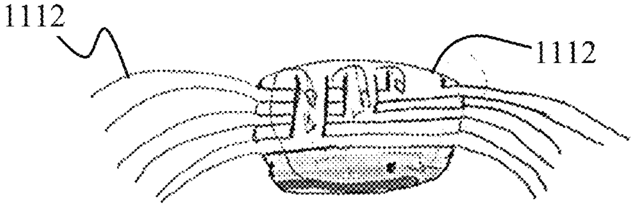
FIGS. 9*b* to 9*e* are variations of the ninth embodiment.
Figure 9C:
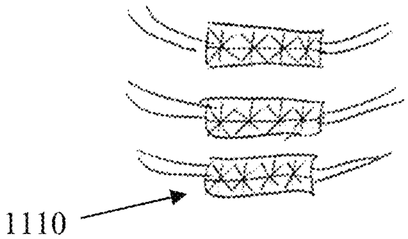
Figure 9D:
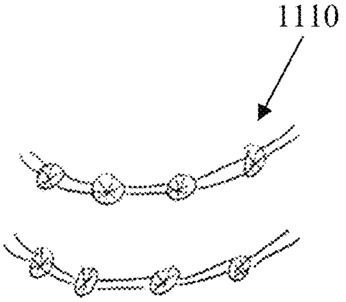
Figure 9E:
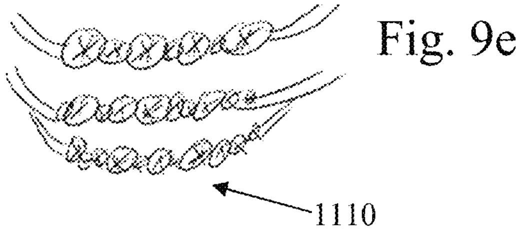

Referring now to FIGS. 8*a* to 8*c*, the device 1000, optionally embodied in a piece of jewelry, is made up of a container 1001. The container 1001 is preferably of transparent, semi-transparent or partially opaque material, or is decorated with stones, crystals, inclusions, or similar decorative materials. The container 1001 may contain a visible or a hidden temperature compensation system. The container 1001 contains fluids 1002. The fluids 1002 may be transparent, semi-transparent or colored. The fluids 1002 are non-miscible with each other and of high viscosity. The device comprises a mixer 1003. The mixer 1003 may be of transparent, semi-transparent or colored material. The surface of the mixer 1003 may be visible or invisibly structured (via, e.g., localized coating, micro-structuration, etc. The mixer is driven by a transmission 1004. FIG. 8*b* shows a contactless magnetic transmission. FIG. 8*a* shows a direct mechanical link. The device further optionally comprises a motor 1005 to drive the transmission 1004. By way of example, the motor 1005 is preferably realized as a spring barrel release mechanism or as an electrical motor. The motor 1005 could further include a speed limiter. A spring barrel 1006 or a battery is preferably used as a source of energy to drive the motor 1005. Alternatively, the transmission is driven manually, e.g. through a cord, a push-button, a crown like a watch rewinding mechanism. A user may activate the energy input (for example by pulling the cord, switching the power on, etc.). The motor 1005 activates the mixer 1003 via the transmission 1004, mixing the fluids 1002 in the container 1001. Such movement generates an evolving random picture of mixing fluids, until consumption of the energy stored in storage 1006 or until switch-off by the user. When the mixing is stopped, the fluids regroup.

Referring now to FIGS. 9*a* to 9*e*, the device, optionally, the jewelry of the invention, is made up of one or more flexible transparent tubes 1102 containing one or more immiscible fluids 1104, 1106. The transparent tubes 1102 containing the fluids are preferably decorated with stones, or crystals, or similar decorative elements 1110, and are connected to a mixer/container 1112. The mixer/container optionally has the capacity to contain the fluids, and may be visible or hidden depending its position (for example, behind the neck of the wearer), activated as mentioned in the example of FIG. 8 (e.g., spring barrel system, electrical motor, push-button, etc.), or may rely only on gravity for its functioning. The immiscible fluids flow into the flexible channels in a sequence defined by the mixer/container. If the mixer/container relies only on gravity for its functioning, after use of the necklace, it is stored in upside-down position, so that the fluids return to the mixer/container, where the fluids regroup according to their density and immiscibility.

Figure 10A:
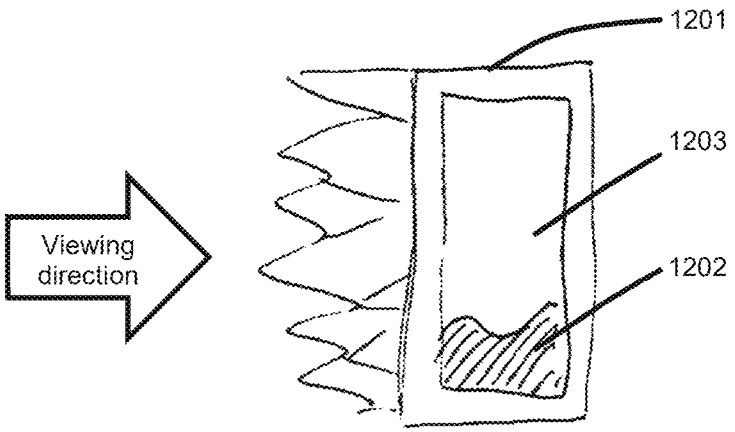
FIG. 10*a* is a schematic view of a tenth embodiment.
Figure 10B:
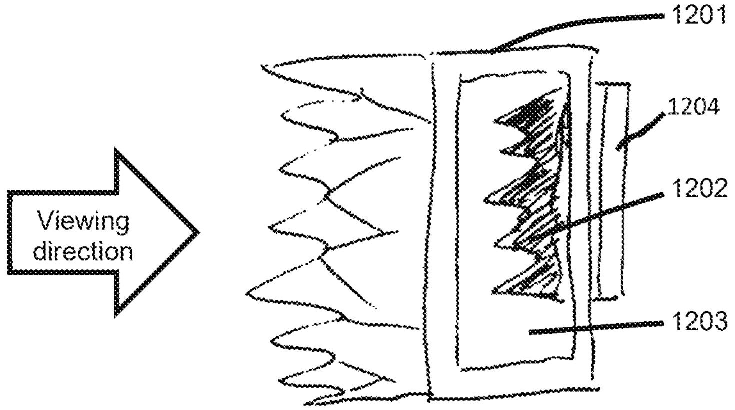
FIG. 10*b* is a phase in operation of the tenth embodiment.

Referring now to FIGS. 10*a* to 10*b*, the device of the invention, preferably a piece of jewelry, is made up of a container 1201. The container 1201 may be of transparent, semi-transparent or partially opaque material, or may be decorated with stones, crystals, inclusions, or similar decorative materials. The container 1201 may contain a visible or a hidden temperature compensation system. The container 1201 contains fluids 1202 and 1203. The fluid 1202 is ferromagnetic and/or contains ferromagnetic particulates and may be transparent, semi-transparent or colored. The fluid 2013 may be transparent, semi-transparent or colored. The fluids 1202 and 1203 are non-miscible with each other. The device of the invention comprises a magnet 1204. The magnet 1204 may be made of a number of smaller magnets arranged in a specific shape. The device of the invention includes a motor 1205 (not represented here, but similar to 1005 of FIG. 8), able to generate a movement of magnet 1204. The motor 1205 is preferably able to generate a complex movement, for example, in more than one direction and/or more than one plane. The motor 1205 is preferably a spring barrel release mechanism, or an electrical motor. It may include a speed limitation. The device of the invention optionally includes an energy storage capacity (not represented here, similar to 1006 of FIG. 8), that may be a spring barrel or a battery. The device includes a manual energy input (not represented here, and similar to FIG. 8) such as a cord, a push-button, a crown like a watch rewinding mechanism. The user activates the energy input 1207 (for example by pulling the cord, switching the power on, etc.); the motor 1205 moves the magnet 1203, which generates a movement of the ferrofluid 1202 in the container 1201. Such movement generates an evolving random shape of ferrofluid 1202, until consumption of the energy stored in storage 1206 or until switch-off by the user. The shape of the ferrofluid is preferably used to generate changes of appearance of the containers' decoration (for example crystals)

Figure 11A:
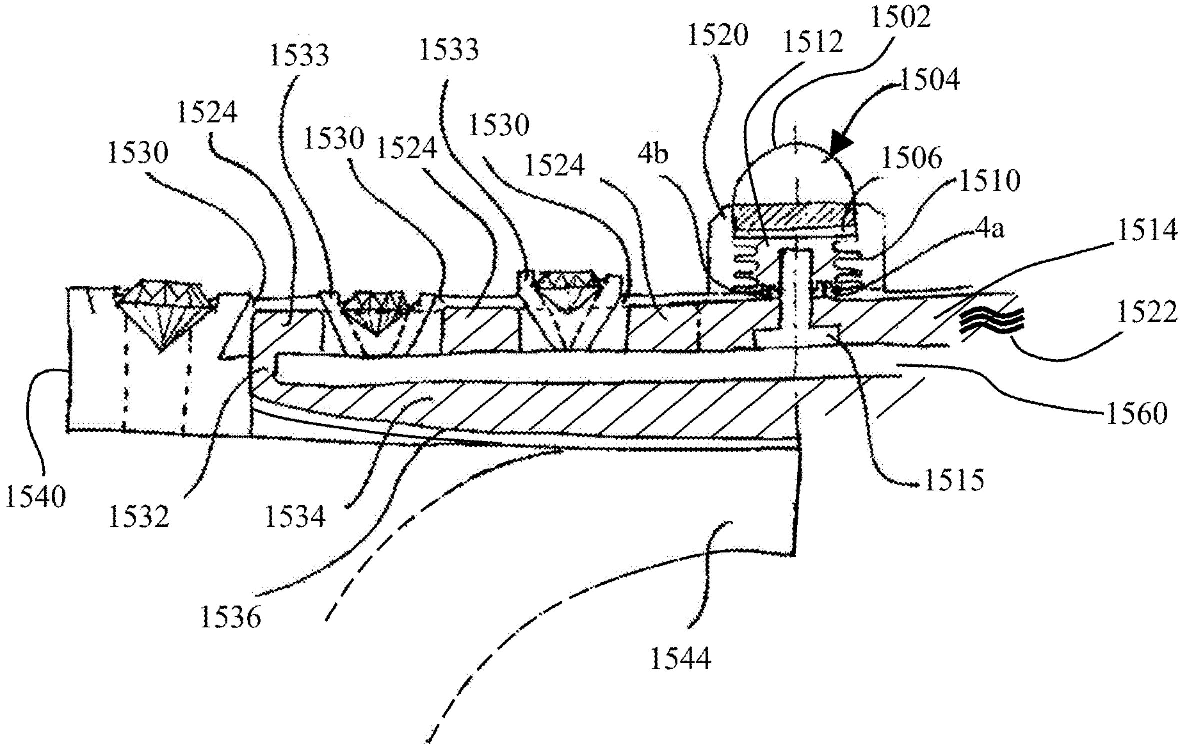
FIG. 11*a* is across-section view of an eleventh embodiment.

Referring now to FIG. 11*a*, a ring with a transparent pane of glass, crystal or sapphire is provided which has a baseplate and elevated channels forming a labyrinth. The elevated channels are fixed on the baseplate in a watertight manner. The system is made up of channels having different forms, as e.g. perpendicular channels, tree structure, spiral, or others forms. Between or within the channels, traditional jewelry embellishments, such as, e.g. elements made of precious material, can be placed along the border of the channels, in the channels, and/or as decoration.

A first movement of the fluids inside the channels is activated through pushing, gliding or displacing a jewel element. This jewel element is mechanically connected with a first bellows. The first bellows contains a first colored or non-colored liquid which may be pressed/forced into the channel(s) through pushing of the jewel element. The first liquid pushes a second colored or non-colored liquid. The first and the second liquid are immiscible. The channels are in liquid communication with a hidden chamber on the backside of the ring. The chamber features an elastic, deformable, metallic membrane 1536. The membrane 1536 is capable of deforming elastically if pressure is applied to the membrane by a finger, for example, and to revert gradually to its initial position and thereby return the second liquid and consequently the first liquid into the bellows. This creates a second movement, substantially in the opposite direction of the first movement. The speed of the first movement as well as the speed of the second movement is controlled either by the hydraulic resistance of the channels itself, by adding small orifices 1507 or 4*b* or through adding a substance to increase the hydraulic resistance.

The cabochon or piece of jewelry of the invention is activated by the user applying pressure as a push-button 1502. The push-button 1502 preferably has a precious stone 1504 embedded into it. A boundary layer 1506 is disposed between precious stone 1504 and a bellows 1510. The bellows 1510 contains the liquid 1512. Fluid restrictors 4*a*/4*b* restrict the fluids flow between the bellows 1510 and a central fluid cavity 1514, providing additional hydraulic resistance as desired. A stroke limiter 1515 limits the stroke of the push-button 1502 to avoid crushing the bellows 1510. A metallic boss 1520 supports the mechanism which activates the movement of the liquids 1522 in the cavity 1514. The internal form of a channel 1524 of a labyrinth 1526 may be rectangular, square (as in FIGS. 11*c* and 11*d*) or rounded or another form. A plate 1530 with holes (to allow the mounted precious stones 1533 to protrude through the plate) is sealingly disposed against a baseplate 1560 in a watertight manner in order to create the system of channels 1524. Traditional jewel elements such as the precious stones 1533 are disposed or mounted above the channels 1524 of the labyrinth 1526. Such channels 1524, given that the plate 1530 is preferably transparent, are visible to the wearer. A passage channel 1532 is provided for the liquid 1522 to be guided into a hidden chamber 1534 while the movement of the liquids is activated. Storage chamber 1534 provides adequate storage space for the liquid 1522. An elastic membrane 1536 made out of metal closes the storage or hidden chamber 1534. A parametrical structure 1540 of, for example, a ring 1542, provides a frame for the labyrinth 1526. Of course, other forms of traditional jewelries besides a ring 1542 can be made, such as a stud, broach or pin, cufflink or a pendant for a necklace. Of course, the ring 1542 includes an annular portion 1544 for fitting on a finger.

Figure 11B:
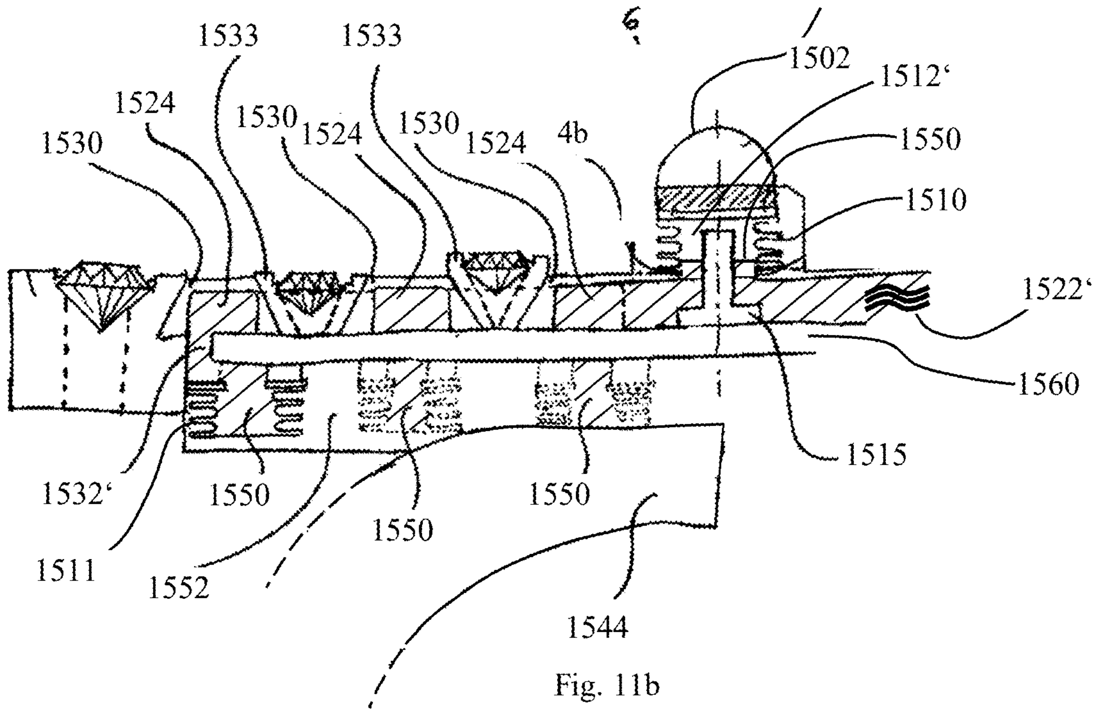
FIG. 11*b* is a cross section view of a variation of the eleventh embodiment.
Figure 11C:
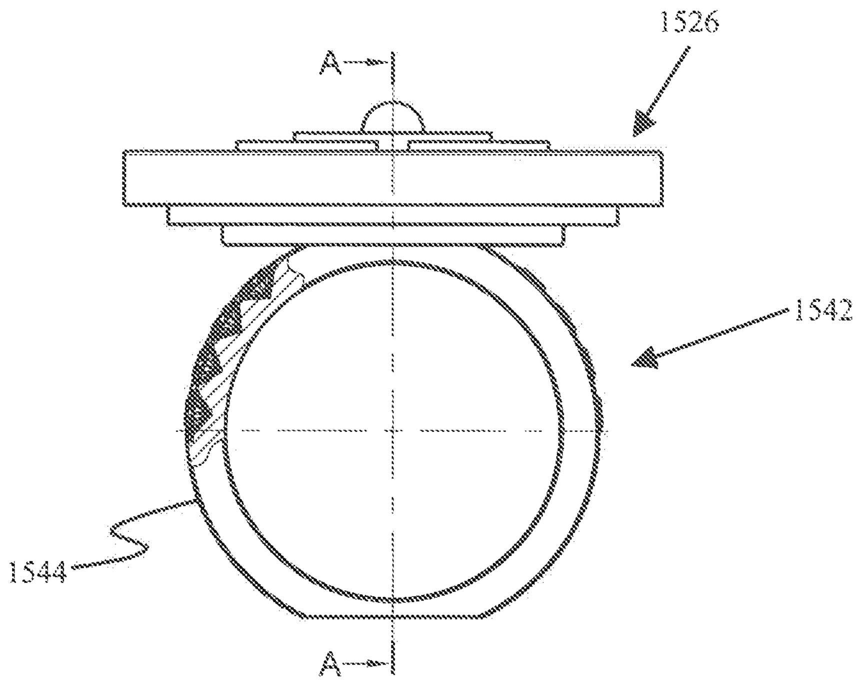
FIG. 11*e* is a cross-section frontal view of the eleventh embodiment.
FIG. 11*d* is a top view of the eleventh embodiment.
Figure 11D:
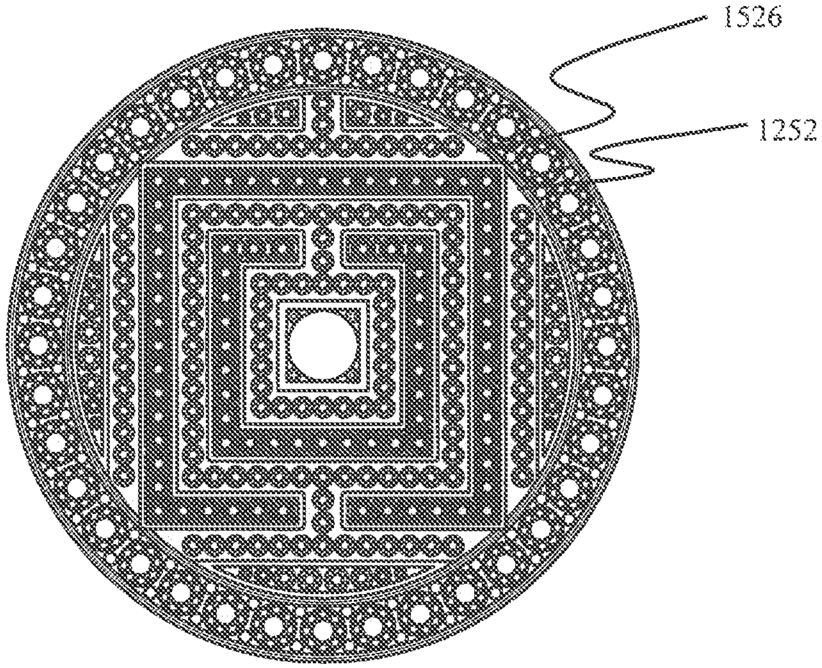

Referring now to FIG. 11*b*, the ring 1542 is provided with a transparent pane or plate 1530 of glass, crystal or sapphire sealingly mounted against a baseplate 1534 and elevated channels 1524 forming a labyrinth 1526. The elevated channels 1524 are fixed on the baseplate 1560 in a watertight manner and may be investment cast in place as part of the baseplate. The jewelry according to this embodiment has channels 1524 that may have different forms, as e.g. perpendicular channels, tree structure, spiral, or any other form. Over the channels 1524 and between the channel walls 1525, traditional jewels, such as e.g. elements made of precious material, can be placed bordering the channels and/or as decoration. Precious stones can of course be placed within the channels.

An initial movement of the liquids 1522 inside the channels 1524 is preferably activated through pushing on, sliding or otherwise displacing a jewel element such as the push-button 1502. This jewel element 1502 is in fluidic communication with a first bellows 1510 via a boundary layer 1506. In another embodiment of the ring 1542', the first bellows 1510 contains a first colored liquid 1512' or non-colored liquid 1522 which is pressed into the channel(s) 1524 by pushing of the jewel element or push-button 1502. The first liquid 1512' pushes the second colored or non-colored liquid 1550. The first and the second liquid 1512' and 1550 are immiscible. Each channel 1524 of the ring 1542' features a hidden bellows 1511 at the end of the channel 1532'. The bellows 1511 at the channels endings are able to re-press or return the second liquid 1550 into the channels 1524 and consequently returning the first liquid 1512' into the first bellows 1510. This creates a second movement, substantially in the opposite direction of the first movement. The speed of the first movement as well as the speed of the second movement is controlled either by the hydraulic resistance of the channels itself, or through adding a substance (e.g., high viscosity element) to increase the hydraulic resistance. A hidden chamber 1552 is provided for the accommodation of the bellows 1511 at the end of the channels 1532'.

Advantageously, the motion generation system is a battery-operated electrical motor agitating at least one of the at least two fluids.

Advantageously, the motion generation system is a spring-barrel energized motor agitating at least one of at least one of the at least two fluids.

Advantageously, the motion generation system is a flexible part of the fluid reservoir initially deformed by the user and which returns to its state of equilibrium.

Advantageously, the motion generation system is the combination of the environment temperature and the thermal expansion property of at least one of the at least two fluids.

Advantageously, the motion generation system is the combination of a magnetic attraction force and a ferromagnetic property of at least one of the at least two fluids.

Advantageously, the motion generation system is the combination of the construct's wearer movements and the mass of at least one of the at least two fluids.

Advantageously, the motion generation system includes the effect of gravity, surface tension of the fluids and/or the fluids reservoir such as capillary action and/or surface micro structuration and/or coating of the fluids reservoir.

Advantageously, the animation causes a change of appearance of the construct's decorative elements, such as switching ON/OFF stones or stone-like looking elements, or immersing/emerging decoration elements in the fluids. The animation may cause a temporary and/or permanent mixing of the fluids.

Advantageously, the particulate is suspended in at least one of the at least two fluids.

Advantageously, the fluids are at least partially immiscible, and at least one of the fluids is a liquid, the other optionally being a gas.

Advantageously, the fluids are of different colors or refraction indexes so that one fluid is readily visually discernable from the other. Decorative elements, such as gold leaf, is preferably suspended in at least one fluid.

Advantageously, the reservoir includes a visible or hidden temperature compensation system.

Advantageously, the construct is a timepiece.

Advantageously, the fluids are movable by a mechanical input.

Advantageously, the construct is a closed system, where the motion of the mobile elements is controlled by the presence of one or more fluids.

Advantageously, in a method of operation of the construct of the invention, a wearer performs the steps of:

a. orienting the construct;
b. activating a motion generator; and/or
c. changing the orientation of the construct so as to change the angle through which the force of gravity acts through the construct, thereby changing or triggering an animation effect.

It should be appreciated that the particular implementations shown and described herein are representative of the invention and its best mode and are not intended to limit the scope of the present invention in any way. Furthermore, any connecting lines shown in the various figures contained herein are intended to represent exemplary functional relationships and/or physical couplings between various elements. It should be noted that many alternative or additional physical connections or functional relationships may be present and apparent to someone of ordinary skill in the field.

Moreover, the apparatus, system and/or method contemplates the use, sale and/or distribution of any goods, services or information having similar functionality described herein.

The specification and figures are to be considered in an illustrative manner, rather than a restrictive one and all modifications described herein are intended to be included within the scope of the invention claimed, even if such is not specifically claimed at the filing of the application. Accordingly, the scope of the invention should be determined by the claims appended hereto or later amended or added, and their legal equivalents rather than by merely the examples described above. For instance, steps recited in any method or process claims should be construed as being executable in any order and are not limited to the specific order presented in any claim. Further, the elements and/or components recited in any apparatus claims may be assembled or otherwise operationally configured in a variety of permutations to produce substantially the same result as the present invention. Consequently, the invention is not limited to the specific configuration recited in the claims.

Benefits, other advantages and solutions mentioned herein are not to be construed as necessary, critical, or essential features or components of any or all the claims.

As used herein, the terms "comprises", "comprising", or any variation thereof, are intended to refer to a non-exclusive listing of elements, such that any process, method, article, composition or apparatus of the invention that comprises a list of elements does not include only those elements recited, but may also include other elements described in this specification. The use of the term "consisting" or "consisting of" or "consisting essentially of" is not intended to limit the scope of the invention to the enumerated elements named thereafter, unless otherwise indicated. Other combinations and/or modifications of the above-described elements, materials or structures used in the practice of the present invention may be varied or otherwise adapted by the skilled artisan to other design without departing from the general principles of the invention.

The patents and articles mentioned above are hereby incorporated by reference herein, unless otherwise noted, to the extent that the same are not inconsistent with this disclosure.

Other characteristics and modes of execution of the invention are described in the appended claims.

Further, the invention should be considered as comprising all possible combinations of every feature described in the instant specification, appended claims, and/or drawing figures which may be considered new, inventive and industrially applicable.

Multiple variations and modifications are possible in the embodiments of the invention described here. Although certain illustrative embodiments of the invention have been shown and described here, a wide range of modifications, changes, and substitutions is contemplated in the foregoing disclosure. While the above description contains many specifics, these should not be construed as limitations on the scope of the invention, but rather as exemplifications of one or another preferred embodiment thereof. In some instances, some features of the present invention may be employed without a corresponding use of the other features. In addition, the term "flexible" as used herein encompasses the concept of variable, in that a variable volume reservoir should be considered a flexible chamber, even if no individual components flex. Accordingly, it is appropriate that the foregoing description be construed broadly and understood as being given by way of illustration and example only, the spirit and scope of the invention being limited only by the claims which ultimately issue in this application.

What is claimed is:

1. A construct to be worn by a wearer, the construct comprising:

at least one reservoir, the reservoir enclosing a liquid and a gas and comprising a wall, the wall surrounding an inner space, the wall having an inside surface and an outside visible surface;

at least one decorative component through which light is capable of passing and which spans the wall from the outside visible surface to the inside surface, and the liquid and the gas having the physical property of refractivity which differs from each other, the liquid and the gas being disposed within the inner space so as to be capable of contact with an at least a portion of at least one decorative component spanning the wall thereof, the portion making up part of the inside surface of the wall whereby, upon contact of the at least one portion of the at least one decorative component with the liquid, the construct is adapted to change the appearance of the at least one portion of the outside visible surface of the decorative component when viewed by an observer through the outside visible surface of the at least one decorative component into the inner space.

2. The construct of claim 1, wherein the at least one decorative component is impermeably mounted in a watertight manner with respect to the reservoir.

3. The construct of claim 1, further including a wearer connection element selected from one of a group of wearer connection elements consisting of a ring, a chain, a wristband, a pin, a clasp, a clip, and a body piercing element.

4. The construct of claim 1, wherein the at least one decorative component is selected from among stones, crystals, or inclusions.

5. The construct of claim 1, including a motion generating system adapted for agitating the two fluids so as to cause intermittent contact of one fluid with at least one decorative component thereby changing the appearance of the decorative components causing a visual animation effect.

6. The construct of claim 1, wherein at least two fluids have a further physical property which is different from the other fluid or the channels'/reservoirs' surface.

7. A construct to be worn by a wearer comprising at least one fluid reservoir having a wall defining an inside and an outside surface of a front plate of the reservoir, at least one inside surface of the reservoir consisting at least in part of the front plate including at least one decorative component through which light is capable of passing and which spans the wall of the front plate from the outside to the inside surface of the reservoir and at least two immiscible fluids having differing physical properties disposed in the fluid reservoir and adapted to intermittently come into contact with a portion of the inside surface of the at least one decorative component which comprise part of the inside surface of the reservoir, the contact or non-contact changing the appearance of the at least one when viewed through the decorative component.

8. A construct to be worn by a wearer, the construct comprising:

at least one reservoir, the reservoir enclosing at least two fluids and comprising a wall, the wall surrounding an inner space, the wall having an inside surface and an outside visible surface each comprising at least one portion of said inner or outer surface;

a plurality of decorative components through which light is capable of passing and which span the wall from the outside surface to the inside surface such that the appearance of the at least one portion of the decorative components change depending on the position of the fluids, and the fluids having the physical property of refractivity which differs from one to the other, the fluids being disposed within the inner space so as to be capable of contact with the at least one portion of the decorative components, the portion making up part of the inside surface of the wall.

9. A construct to be worn by a wearer, the construct comprising:

at least one reservoir, the reservoir comprising a wall, the wall surrounding an inner space, the wall having an inside surface and an outside visible surface;

a plurality of decorative components through which light is capable of passing and which span the wall from the outside visible surface to the inside surface, and at least two immiscible fluids having the physical property of refractivity which differs from one fluid to the other fluid, the fluids being disposed within the inner space so as to be capable of contact with a transparent or semi-transparent portion of the decorative components, the portion making up part of the inside surface of the wall.

* * * * *